(12) United States Patent
Goodridge et al.

(10) Patent No.: US 11,714,901 B2
(45) Date of Patent: *Aug. 1, 2023

(54) PROTECTING A COMPUTER DEVICE FROM ESCALATION OF PRIVILEGE ATTACKS

(71) Applicant: Avecto Limited, Manchester (GB)

(72) Inventors: John Goodridge, Cheshire (GB); Thomas Couser, Lancashire (GB)

(73) Assignee: Avecto Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,476

(22) Filed: Apr. 26, 2022

(65) Prior Publication Data
US 2022/0335125 A1 Oct. 20, 2022

Related U.S. Application Data

(63) Continuation of application No. 16/382,578, filed on Apr. 12, 2019, now Pat. No. 11,321,455.

(30) Foreign Application Priority Data

Apr. 18, 2018 (GB) ...................................... 1806289

(51) Int. Cl.
*G06F 21/00* (2013.01)
*G06F 21/55* (2013.01)
*G06F 9/445* (2018.01)

(52) U.S. Cl.
CPC ............ *G06F 21/554* (2013.01); *G06F 9/445* (2013.01); *G06F 2221/033* (2013.01); *G06F 2221/2101* (2013.01)

(58) Field of Classification Search
CPC .. G06F 21/554; G06F 9/445; G06F 2221/033; G06F 2221/2101;
(Continued)

(56) References Cited

U.S. PATENT DOCUMENTS 10,565,378 B1 * 2/2020 Vincent .................. G06F 21/566
2017/0026379 A1 * 1/2017 Lu ......................... H04L 63/0884
(Continued)

OTHER PUBLICATIONS

Davi, L., Dmitrienko, A., Sadeghi, AR., Winandy, M.(2011). Privilege Escalation Attacks on Android. In:Burmester, M., Tsudik, G., Magliveras, S.,Information Security.Lecture Notes in Computer Science, vol. 6531.Springer, Berlin, Heidelberg. https://doi.org/10.1007/978-3-642-18178-8_30.p. 346-360. (Year: 2010).*

*Primary Examiner* — Kendall Dolly
(74) *Attorney, Agent, or Firm* — Morris, Manning & Martin, LLP; Daniel E. Sineway, Esq.; Adam J. Thompson, Esq.

(57) ABSTRACT

A computing device can receive a first notification that a process has started on the at least one computing device. The computing device can record a first access token associated with the process into the token cache. The computing device can receive a second notification that the process has interacted with the operating system to perform at least one of a set of predetermined operations on the at least one computing device. The computing device can capture a second access token from the process. The computing device can perform a comparison of the second access token captured from the process against the first access token recorded into the token cache. The computing device can determine that an escalation of privilege attack has occurred based on the comparison.

20 Claims, 7 Drawing Sheets

(58) Field of Classification Search
CPC ........... G06F 2221/2141; G06F 21/604; G06F 2221/2113; G06F 21/577
See application file for complete search history.

(56) References Cited

U.S. PATENT DOCUMENTS

2019/0268152 A1* 8/2019 Sandoval .............. H04L 9/3213
2019/0311115 A1* 10/2019 Lavi ........................ G06F 21/44

* cited by examiner

PROTECTING A COMPUTER DEVICE FROM ESCALATION OF PRIVILEGE ATTACKS

RELATED APPLICATIONS

This application is a continuation of U.S. application Ser. No. 16/382,578, filed on Apr. 12, 2019 and entitled "PROTECTING A COMPUTER DEVICE FROM ESCALATION OF PRIVILEGE ATTACKS RELATED APPLICATIONS," which claims the benefit of priority from GB 1806289.3, filed Apr. 18, 2018, the disclosures of which are incorporated herein by reference in their entireties.

BACKGROUND

Technical Field

The present invention relates generally to the field of computers and computer devices. More particularly, the present invention relates to a computer device and to a method of protecting the computer device from escalation of privilege attacks.

Related Art

Security is vitally important in modern computer systems and computer networks. Malicious actors frequently look for vulnerabilities in key areas, such as the kernel of the operating system, which can then be exploited in an attack. In particular, malicious code may attempt to obtain enhanced privilege levels, beyond the level intended for that security context, and then use those rights to gain access to other restricted or sensitive parts of the computer system. Such attacks are commonly referred to as 'escalation of privilege' attacks ('EoP' attacks).

Typically, the vulnerabilities will exist until the originator of the operating system issues an update or security patch. Hence, the current mechanisms to defend against EoP attacks are highly reactive and rely on ensuring that each computer device is kept up to date with the latest updates and patches for the operating system. However, keeping computer devices up to date is notoriously unreliable, difficult and time-consuming, especially in a large organisation.

Therefore, an improved mechanism is desired which will protect the computer device even if malicious code performs an escalation of privilege attack.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention there is provided a computer-implemented method, a computer system and a computer-readable storage medium as set forth in the appended claims. Additional features will be appreciated from the dependent claims, and the description herein.

By way of introduction, the following examples describe a kernel driver which records an access token as initially associated with a user process. Later, the user process presents its access token when requesting certain operations through the operating system. The kernel driver detects that the user process has been subject to an escalation of privilege attack by evaluating the access token in its current form as against the initially recorded access token and, in response, performs a mitigation action such as suspending the user process.

In one example, there is described a method for protecting a computer device against escalation of privilege attacks, comprising: recording, by a kernel driver, an initial access token of a user process which will execute on the computer device; capturing a current access token as presented by the user process when requesting an operation through an operating system of the computer device; and detecting, by the kernel driver, that the user process has been subject to an escalation of privilege attack by evaluating the current access token against the initial access token and, in response, performing a mitigation action with respect to the user process.

In one example, there is described a computer device configured to perform any of the methods discussed herein. The computer device may include a kernel driver in a kernel mode supported by an operating system of the computer device, wherein the kernel driver is configured to perform operations including: recording, in a token cache accessible to the kernel driver, an access token of a user process which executes on the computer device; obtaining a current access token as presented by the user process when requesting an operation through the operating system of the computer device; and detecting that the user process has been subject to an escalation of privilege attack by evaluating the current access token of the user process with reference to the access token as recorded in the token cache and, in response, causing a mitigation action with respect to the user process.

In one example, a tangible non-transient computer-readable storage medium is provided having recorded thereon instructions which, when implemented by a computer device, cause the computer device to be arranged as set forth herein and/or which cause the computer device to perform any of the methods as set forth herein. The operations may include recording an access token of a user process which will execute on the computer device; obtaining an access token as presented by the user process when requesting an operation through an operating system of the computer device; detecting that the user process has been subject to an escalation of privilege attack by evaluating the presented access token with reference to the recorded access token; and performing a mitigation action with respect to the user process in response to detecting the escalation of privilege attack.

BRIEF DESCRIPTION OF THE DRAWINGS

For a better understanding of the invention, and to show how example embodiments may be carried into effect, reference will now be made to the accompanying drawings in which.

DETAILED DESCRIPTION

The example embodiments will be discussed in detail in relation to computer devices using Windows® operating systems provided by Microsoft Corporation of Redmond, Washington, USA, and with particular reference to the Windows 10® operating system. However, the teachings, principles and techniques as discussed below are also applicable in other specific example embodiments. In particular, the described examples are useful in many computer systems having a security model which employs discretionary access control.

Figure 1:
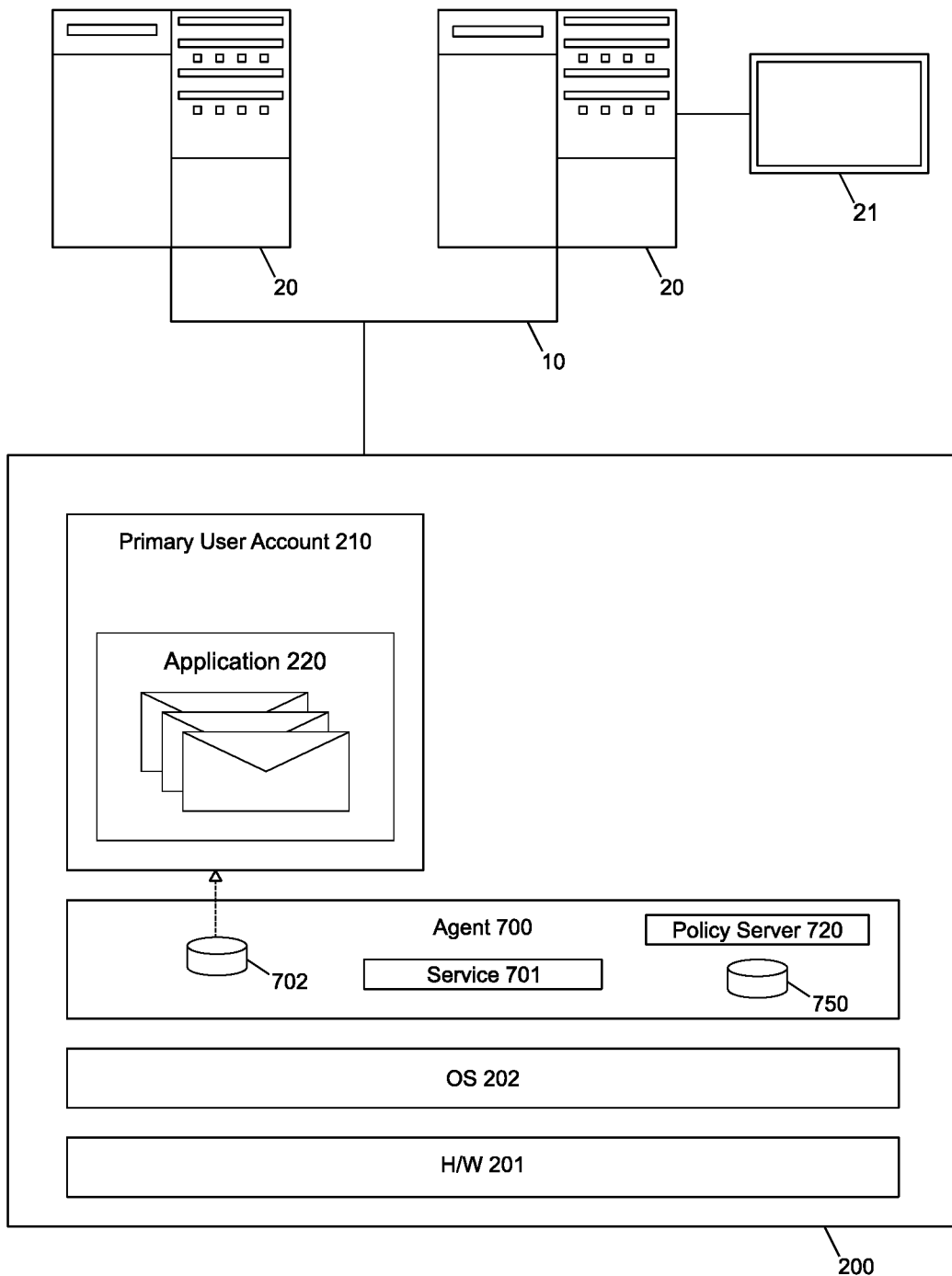
FIG. 1 is a schematic view of an example computer device in a computer network.

FIG. 1 is a schematic overview of an example computer device and network. In this simplified example, an end-user computer device 200 is coupled by a network 10 to a set of servers 20. For example, the network 10 can be a private network, a virtual private network, an intranet, a cloud, or the Internet. In practice, computing environments for large-scale corporations will typically include many thousands of individual end-user computer devices 200 coupled to many tens or many hundreds of servers 20.

Each end-user computer device 200 may take any suitable form factor. As examples, the device 200 might be a desktop computer, a portable computing device, laptop, tablet, smartphone, wearable device, or an emulated virtual device on any appropriate host hardware. The illustrated computer device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202 runs on the hardware layer 201 to provide a runtime environment for execution of applications 220 and their related user processes. This runtime environment typically provides resources such as installed software, system services, drivers, and files. In this illustration, the applications 220 include an email client which is used to send and receive email messages. Of course, many other types of software application are available and can be provided according to the needs of the user of each particular device.

In this example, the operating system 202 applies a security model wherein access privileges are based on a user account 210. The operating system 202 may define privilege levels appropriate to different classes of users, or groups of users, and then apply the privileges of the relevant class or group to the particular logged-in user (e.g. ordinary user, super-user, local administrator, system administrator, and so on). The user is authenticated such as by logging-in to the computer device 200, e.g. with a user identity and password, and these user credentials may be validated locally or via a remote service such as a domain controller. The current user, via their previously prepared security account, thus acts as a security principal in the security model. The operating system 202 of the computer device 200 then grants appropriate privileges to the processes and applications 220 which execute in the security context of that primary user account 210.

In this example, the computer device 200 further comprises an agent 700. The agent 700 may comprise one or more software and/or hardware modules, such as executables, dynamic libraries, plug-ins, add-ins, add-ons or extensions. In the context of Windows operating systems, the agent 700 may comprise a Windows service 701 which acts as a core module or kernel component. In a macOS environment, the agent 700 may comprise a daemon, which runs as a background process on the computer device. The agent 700 may further comprise one or more injected libraries 702 (i.e. a dynamic linked library DLL) which may be injected by a driver into the context of the user account 210. Thus, the agent 700 is configured to operate in close cooperation with the operating system 202 and with the client applications 220.

In this example, the agent 700 supports core capabilities for security of the computer device. In particular, the agent 700 suitably implements at least a privilege management function and an application control function. The agent 700 acts as a secure gatekeeper to control activity on the computer device 200 in addition to, and in cooperation with, the existing security mechanisms of the operating system 202.

When considering privilege management, it is desirable to implement a least-privilege access security model, whereby each user is granted only a minimal set of access privileges. Many application programs however require a relatively high privilege level, such as a local administrator level, in order to be installed, modified or removed, including permitting access to the registry. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, e.g. by accidently modifying the registry, leading to errors or corruption within the computer device. Further, an infection or malware may access the computer device with the deliberate intention of subverting security or causing damage, such as by modifying a normal and otherwise harmless application, e.g. to hide a key log to obtain credit card numbers or bank details.

In one example, the primary user account 210 has a relatively low privilege level. The agent 700 then selectively enables access to higher privilege levels, e.g. a local administrator level, when needed to perform certain tasks. Thus the agent 700 provides the privilege level to perform a specific task, but does not provide a general high level privilege to the user account. Conversely, the agent 700 in some examples is also able to downgrade the privilege level, so that certain tasks are carried out at a privilege level lower than that of the current user account 210.

For application control, the agent 700 is arranged to ensure that only authorised applications 220 may be installed on the computer device 200. For example, the agent 700 may comprise a list of approved and/or restricted applications. There may be a sophisticated set of rules which define the conditions under which each application may be installed, modified, or removed, in relation to the intended host computer device 200 and the relevant user account 210. Thus, in this example, the email client application 220 on the computer device 200 will only be installed, removed and/or modified (e.g. updated to a more recent version) if permitted by the rules as implemented by the agent 700.

In one example, the agent 700 is coupled to a policy file 750. The policy file 750 stores a set of policies which define responses of the agent 700 to requested actions or tasks. A policy server 720 may be provided to make policy decisions based on the policy file 750. Suitably, the policy server 720 is provided as a service locally on the computer device 200 which links to other components of the agent 700. That is, the policy server 720 may reside as a component within the agent 700, or can be implemented as a separate service that is communicably linked to the agent 700. The policy server 720 may operate by receiving a policy request message, concerning a requested action and related meta-information, and returning a policy result based thereon. In one example, the agent 700 is configured to capture a set of identities, and may then provide these identities as part of the policy request. Such identities may include, for example, a user identity (UID) of the relevant user account 210, a group identity (GID) of a group to which that user account 210 belongs, a process identity (PID) of a current process which has initiated the action or task in question, and/or a process identity of any parent process (PPID). Suitably, the policy server 720 determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy server 720 as appropriate, but which is not accessible by the user account 210. Updates to the policy file 750 may be generated elsewhere on the network 10, such as by using a management console 21 on one of the servers 20, and then pushed, or pulled, to each instance of the agent 700 on each device 200. The policy file 750 is readily updated and maintained, ensuring consistency for all devices across the network. In this way, the agent 700 is robust and manageable for a large-scale organisation with many thousands of individual computer devices 200. Also, the agent 700 is able to leverage rules which have been developed in relation to application control, such as defining user groups or user roles and related application permissions, and now extend those same rules also to privilege management, and vice versa.

In some examples, the agent 700 is configured to perform custom messaging. In particular, agent 700, whether acting directly or via a cooperating proxy or plugin, may present a message dialog to the user. This message dialog may be presented in a terminal from which a current action of interest was invoked by or on behalf of the user. Thus, the custom messaging may be presented on a display of the computer device 200 for interaction with the user. Input from the user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the user in order to proceed with the requested action. As an example, the additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file 750 to meet the evolving needs of a large user population.

Notably, custom messaging allows the agent 700 to provide a rich and informative set of interactions with the users. Each of these individual custom messaging actions may be defined in the policy file 750. The custom messaging may eventually result in a decision to allow or block the requested action. An appropriate allow or block operation is then carried out as required.

In this example, the agent 700 may further perform auditing in relation at least certain requests. The auditing may include recording the customised messaging, if any, and may include recording an outcome of the request. Audit reports may be extracted or uploaded from each end-user device 200 such as to the management console 21 on the servers 20 at any suitable time or frequency or based on any suitable event. Each of these auditing functions may be defined in the policy 750.

In some examples, the agent 700 is configured to perform passive handing of a request. In this case, the request is presented to the originally intended recipient, typically within the operating system 202, and any responses may be returned transparently. In one example, passive handling is defined by the policy file 750. The agent 700 can meanwhile audit the requests which were handled passively, again consistent with the policy file 750. Notably, this passive handling function allows the action to proceed while the requesting user process or application is unaware of the agent 700 as intermediary. Advantageously, default behaviour of system is maintained for those actions that the agent 700 determines should have passive handling. Also, there is now a fail-safe option, in that the system will maintain an expected behaviour for actions that are passively handled. This passive handling is useful particularly in the event that a particular user or request is not specified in the policy file 750, because default behaviour is still enacted. Hence, the system can now quickly and safely supersede the original behaviour for specific situations, allowing rapid responses and network-wide consistency when needed, while still enabling existing legacy functionality and behaviour to continue in place for other actions, users and/or devices, as appropriate.

EoP Protection

Figure 2:
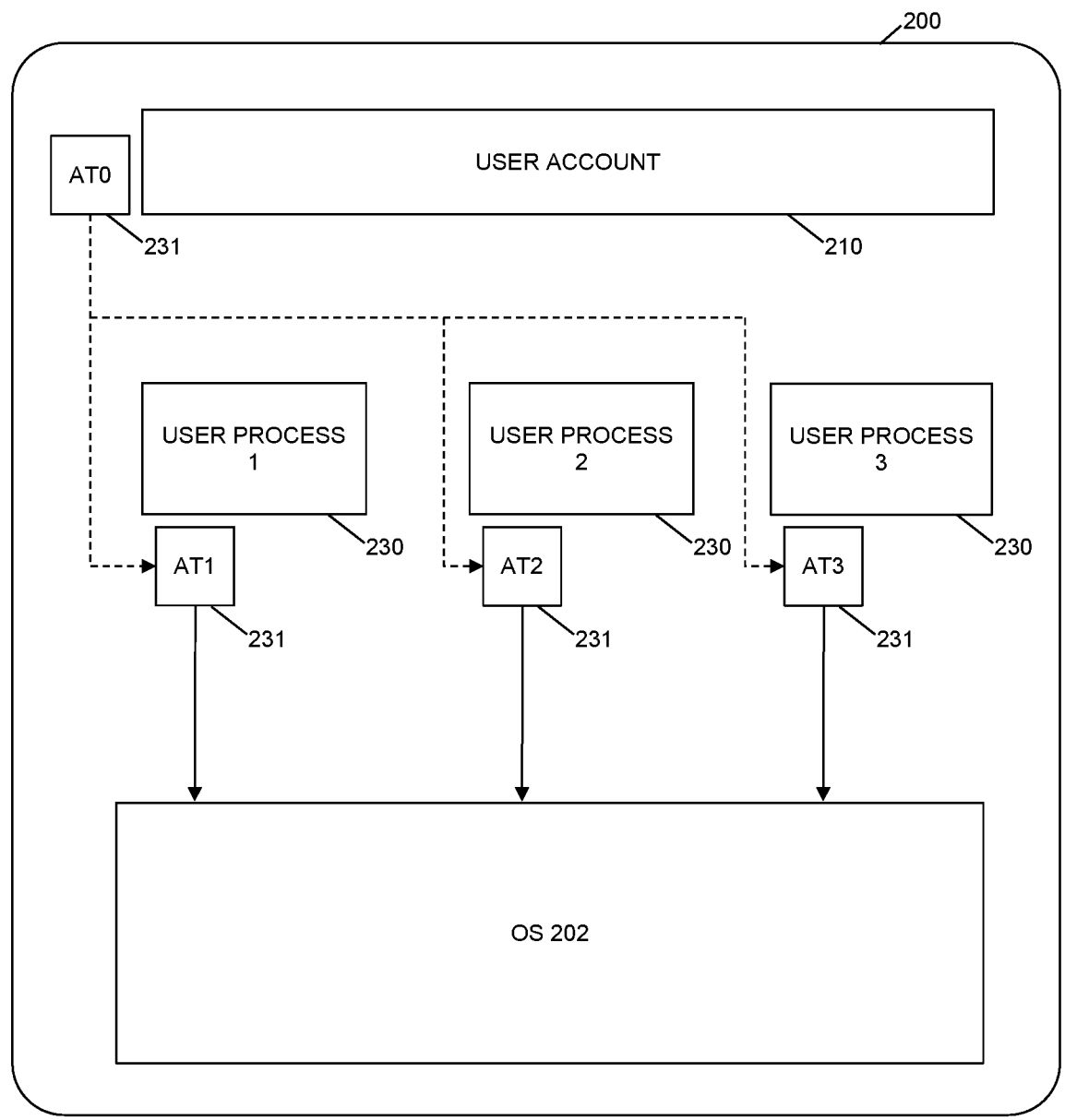
FIG. 2 is a schematic view of the example computer device.

FIG. 2 is a schematic view of the example computer device 200. In particular, FIG. 2 shows a plurality of user processes 230 each of which is associated with a respective access token 231. Typically, this access token 231 is derived from the security account 210 of the logged-in user. That is, an access token AT0 is created by the operating system 202 after authenticating the user (i.e. by logging-in with their user-name and password), and then each user process 230 has its own access token AT1, AT2, AT3 copied from that master access token. In this way, each user process 230 gains rights and privileges within the computer device 200 under the relevant user account 210. Each user process 230 will present its access token 231 to the operating system 202 when performing operations in the computer device 200, such as interacting with securable objects or requesting system tasks. Typically, the access token 231 is established by the operating system 202 when each user process 230 is created and, ordinarily, does not change thereafter. There are situations where the access token 231 may be legitimately altered, such as when performing privilege management by the agent 700. However, it is also possible for the access token 231 to be changed maliciously, especially by exploiting vulnerabilities in the kernel of the operating system 202.

The access token 230 comprises several fields of information, including inter alia a security identifier (SID) for the user's account, SIDs for any groups of which the user is a member, a logon SID that identifies the current logon session, and a list of the privileges held by either the user or their groups. These fields are held in structures including TokenUser, TokenGroups TokenPrivileges, TokenElevation, TokenIntegrityLevel, TokenSource and TokenStatistics, amongst others. Each of these structures may be queried or manipulated by a process having sufficient privileges. In particular, a malicious attack may attempt to alter the SIDs of the access token 231 (e.g. to include the SID of another user who has higher privileges or a privileged group SID such as the administrator group). When the privileges have been elevated in this way, the access token 231 may then be used by the malicious code to access other important resources in the computer device 200.

Figure 3A:
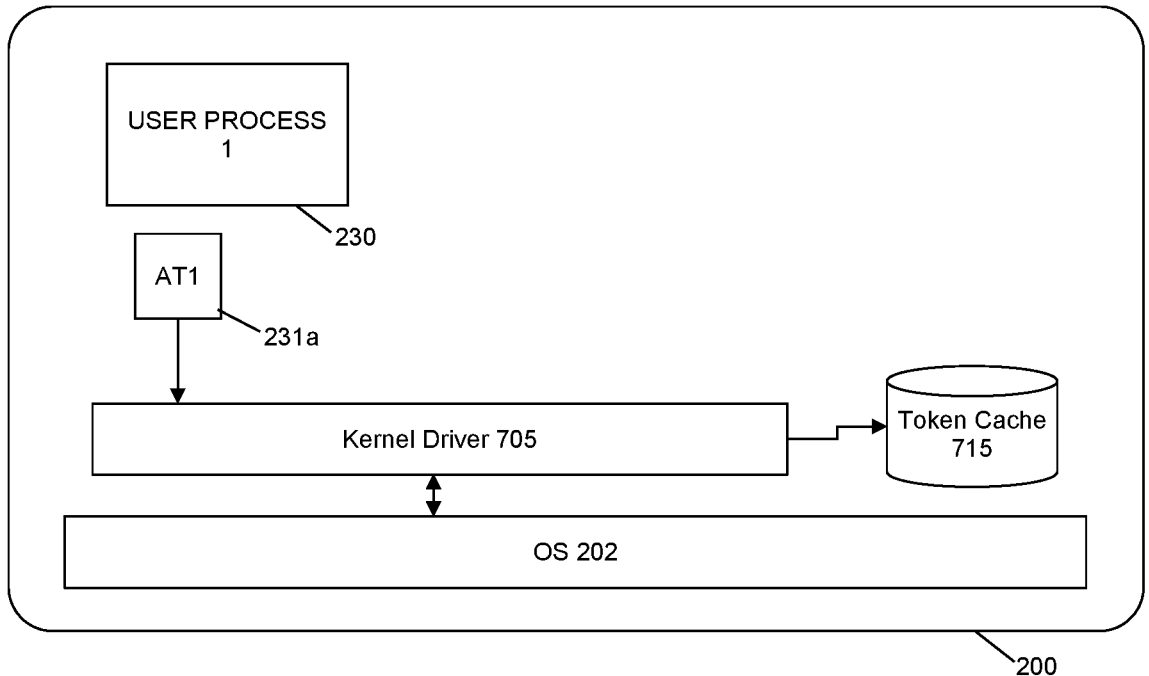
FIGS. 3A & 3B are schematic views of the example computer device.
Figure 3B:
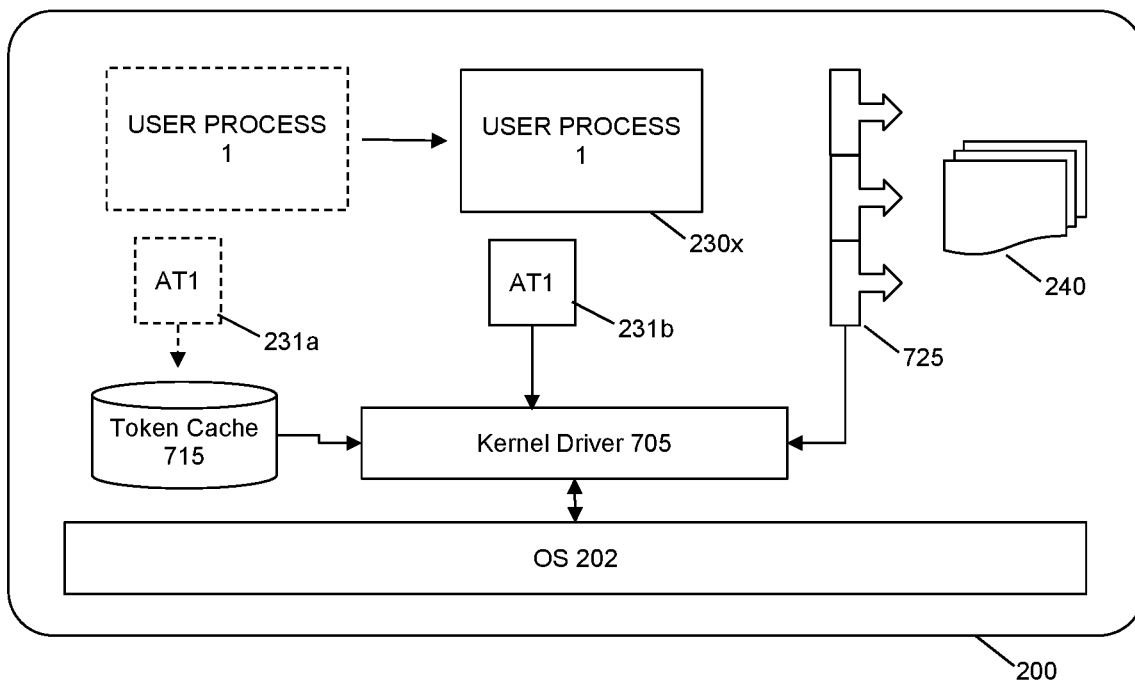

FIGS. 3A and 3B show the example computer device 200 in more detail concerning protection from EoP attacks. In this example, the computer device 200 is provided with a kernel driver 705 which operates in cooperation with the operating system 202. As in FIG. 3A, the kernel driver 705 is configured to obtain and record, in a token cache 715, information of an access token 231a of each newly-created process 230. This information relates to the form of the access token 231a at an initial point in time and allows that form of the access token 231a to be retrieved later. Also, as in FIG. 3B, the kernel driver 705 obtains information of an access token 231b when presented subsequently to the operating system 202 by each user process 230. Comparing information of a currently presented access token 231b against the previously cached initial token 231a allows an escalation of privilege attack to be detected.

As shown in FIG. 3B, the kernel driver 705 monitors the user processes 230 as they attempt to perform operations on the computer device 200 through the operating system 202. In this example, the kernel driver 705 monitors a set of trigger points 725 where the user processes 230 will interact with the operating system 202. Suitably, the trigger points 725 are established in advance and will be activated when the user processes 230 attempt to reach any of a set of protected resources 240. The kernel driver 705 examines the current access token 231b as presented each time any of the user processes 230 interact with these trigger points 725. The current token 231b is then compared against the access token 231a in the token cache 715 as previously associated with that process 230. Where an unexpected escalation of privilege is detected then the relevant infected or malicious process 230x is identified. In response, a mitigation action is taken such as suspending the offending process 230x. These features will each be explored in more detail below.

Figure 4:
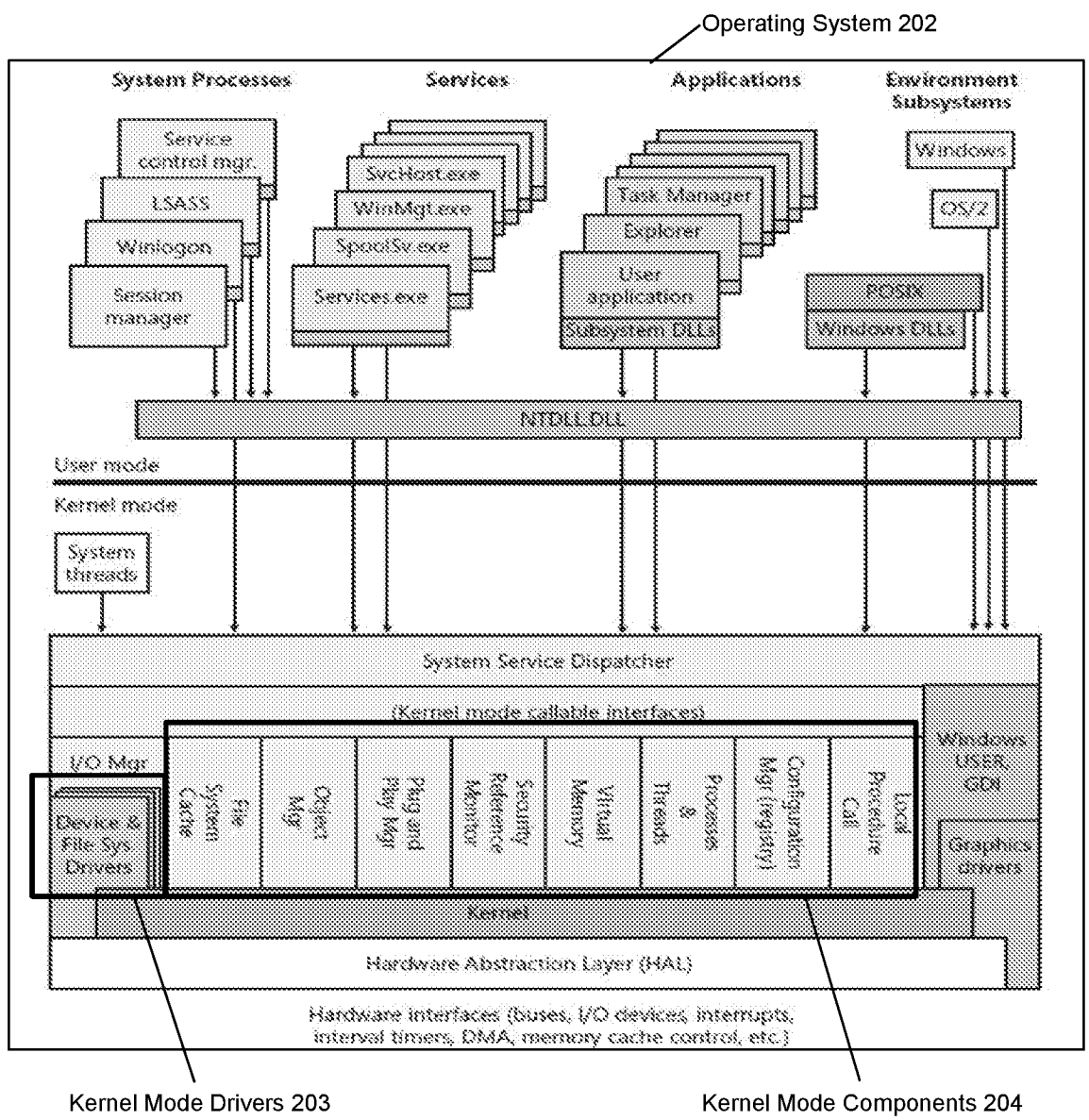
FIG. 4 is a schematic view of an example operating system in the computer device.

FIG. 4 is a schematic view illustrating components within the operating system 202 of a typical Windows system. The operating system 202 is shown logically divided into a user mode and a kernel mode. The kernel mode includes a plurality of kernel mode drivers 203, here illustrated by the device drivers and file system drivers. These drivers 203 call routines that are exported by various other kernel components 204. These kernel mode drivers 203 are typically supplied by original equipment manufacturers (OEMs) and independent hardware vendors (IHVs) to augment the native components of the operating system 202 for particular hardware devices (e.g. adding additional security checks for a particular keyboard). However, the kernel drivers 203 are also useful for other purposes. The kernel drivers 203 may be chained together, leading from highest-level drivers through intermediate level drivers to lowest-level drivers, optionally with zero, one or more drivers at each level. The intermediate drivers may include class drivers for a particular class of device, function drivers as the main driver, e.g. as the operational interface to control a particular peripheral device on an I/O bus, and filter drivers inserted above or below a function driver which modify behaviour of the system. Further background explanation in relation to kernel-mode drivers is readily available for the skilled person. In the present example, the kernel driver 705 of FIGS. 3A and 3B is implemented as one of the kernel mode drivers 203. Hence, it is appropriate to refer to a kernel driver as terminology that will be familiar to those skilled in the art. However, in other specific implementations, another component having suitable kernel-level privileges could perform the operations described herein, or they could be supported by a component natively within the operating system.

Figure 5:
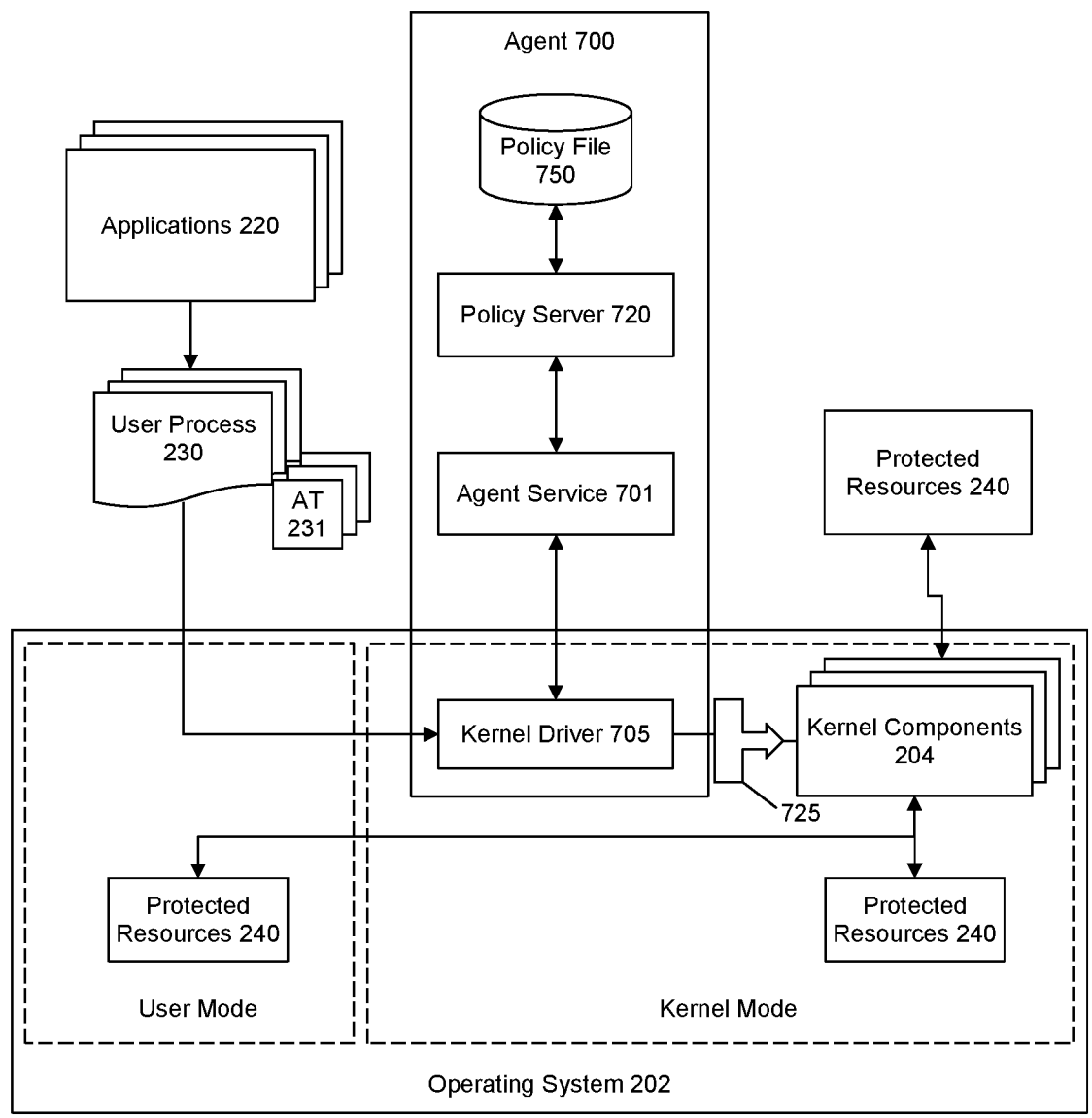
FIG. 5 is another schematic view showing the example computer device in more detail.

FIG. 5 is another schematic view of the example computer device 200. In this example, the kernel driver 705 suitably operates in cooperation with the service 701 which, as discussed above, is a core component of the agent 700. The kernel driver 705 in the kernel mode of the operating system 202 has corresponding greater privileges than the user mode. In particular, the kernel driver 705 has access to kernel mode native APIs of the operating system 202, rather than the user-mode Windows API for the applications 220. Suitably, the kernel driver 705 connects to the kernel mode components 204 of the operating system 202. These kernel mode components 204 include, for example, the object manager which manages access to all resources in the computer device 200, and the configuration manager which controls configuration including access to the system registry, amongst others.

As noted above, the monitoring kernel driver 705 is configured to establish a record of the access token 231a which is allocated to each user process 230. Conveniently this record is held in the token cache 715 as a data structure that is managed locally by the kernel driver 705. In one example the kernel driver 705 uses a singly-linked list structure (e.g. a SINGLE_LIST_ENTRY structure in the kernel driver 705). Storing the token cache 715 locally within the kernel driver 705 allows for efficient processing and avoids inter-process communication (IPC) or user-mode to kernel-mode communication. In other examples, the token cache 715 may be held elsewhere, such as by another component of the agent 700.

In this example, each entry in the token cache 715 stores the process identity (PID) of a particular user process 230 and information about its respective access token 231. The stored information about the access token 231 can take multiple forms. In one example, the stored information comprises the memory address of the access token 231. In another example, the stored information includes a handle for the access token 231. In another example, the stored information includes a duplicate of the access token 231. In a still further example, the stored information includes a copy of certain structures and fields taken from the access token (i.e. a partial duplicate recording only certain fields which are of interest).

In one example, the kernel driver 705 is configured to receive a notification from the OS 202 whenever a process is started on the computer device 200. To this end, the kernel driver 705 may register a callback with the OS 202 using an appropriate function, such as PsSetCreateProcessNotifyRoutine. This callback routine will then be called by the OS 202 whenever a process is created, thereby notifying the driver 705.

In response, the kernel driver 705 may find the memory address of the allocated token 231a and record that memory address in the token cache 715. For example, the memory address may be located by calling the function PsLookupProcessByProcessId with the PID of the newly created process, which returns a pointer to the EPROCESS structure of the process 230, and then calling PsReferencePrimaryToken which provides a pointer to its access token 231a. In this example, determining the memory address is performed in response to the process creation notification and thus before the process has had opportunity to elevate the token. However, other example embodiments could perform this operation at some other point during the lifecycle of the process.

The memory address may be used to probe the information provided by the access token 231a. In one example, offsets may be used to locate the individual fields of interest. Alternately, the function SeQueryInformationToken allows the kernel driver 705 to gather information without relying on offsets within the PACCESS_TOKEN structure. This probing operation may be repeated as needed over time, i.e. by using the PID as a key to retrieve the memory address from the token cache 715. In one example, some or all of the information obtained by querying the access token 231a may be duplicated, e.g. into the token cache 715, and then retrieved when required. Likewise, the kernel driver 705 may obtain the memory address of the current token 231b and then probe its content (and, if desired, add that information to a cache to allow ongoing comparisons). Comparing those memory addresses and/or probing the content of the access tokens enables an EoP attack to be detected.

In this example, the kernel driver 705 establishes one or more trigger points 725 to be notified of certain operations within the computer device 200. These trigger points 725 are defined to protect a set of resources 240 which are of interest to malware. Ordinarily, the system security is sufficient to protect access to these protected resources 240, based on the ordinary privileges of the user account 210. However, where that system security is overcome by an escalation of privilege attack, then the present mechanism is invaluable to defend the computer device 200.

Figure 6:
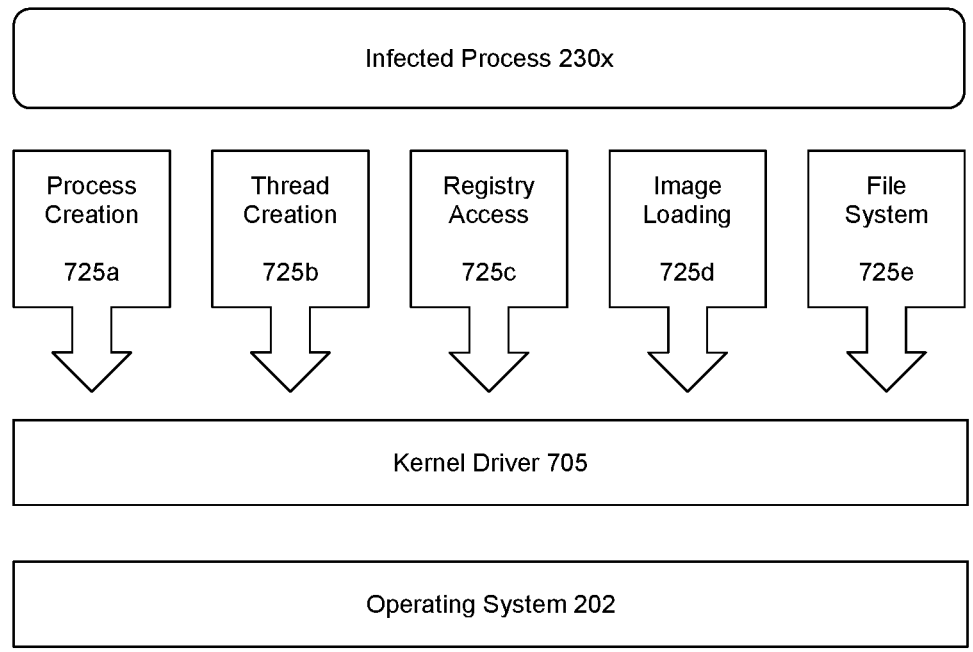
FIG. 6 is another schematic view showing the example computer device.

FIG. 6 is a schematic view of the computer device 200 with a set of the trigger points 725, which may include any one or more of the following examples in any convenient combination. The skilled person will appreciate that other trigger points may also be relevant in other specific example implementations.

A first trigger point 725a concerns creation of a child process, which research has shown is a common activity of malware. In this example, the process creation callback as already described above not only allows the access token 231a to be cached for each new user process 230, but further acts to detect presentation of an unexpectedly elevated access token. That is, this first trigger point may be used to detect that the access token 231b as presented by the parent process 230x when requesting creation of this newly created child process differs from the access token 231a as recorded in the token cache 715 for that parent process 230x.

In more detail, the new process notification PsSetCreateProcessNotifyRoutine may cause the kernel driver 705 to traverse the cache 715 for an entry matching the PID of the parent process 230x that launched this new process. The memory address of the access token 231a of that parent process 230x may then be obtained using the same technique as described above. With both the cached address and the current address of the access token 231 of the parent process 230x in hand, the kernel driver 705 may now compare those addresses to check for an initial inaccuracy in the token information. Also, the information may be probed in more detail. This trigger point 725a ensures that the newly created process was not launched via a parent process 230x that has had its original access token 231a replaced with a more privileged access token 231b.

A second example trigger point 725b is to monitor for creation of a thread. In one example this trigger point is enabled by a callback using the OBRegisterCallbacks API with the PSThreadType parameter. More particularly, this second trigger point 725b monitors for creation of a remote thread that runs in the virtual address space of another process, which may be achieved by filtering out any threads created in the process from which the calling thread originates. Again, research has revealed that malware commonly attempts to hijack another pre-existing process by injecting a thread into that target process. Hence, monitoring only for remote thread creation helps to decrease noise and improve efficiency. Suitably, this second trigger point 725b prompts the kernel driver 705 to check the access token 231b as used for the newly created thread against the recorded access token 231a of the requesting process 230x.

A third trigger point 725c concerns access to the system registry. In this example, the kernel driver 705 suitably uses a callback to be notified of attempts to access the registry. In this example, the kernel driver 705 registers a set of callbacks with the configuration manager, whereby a process 230 attempting any of a set of relevant registry operations provokes a respective callback to the kernel driver 705. Research shows that malware will attempt to gain persistence via the registry, and the ability to add and modify registry keys is of interest in many malicious processes.

In one example system, the kernel driver 705 can call the CmRegisterCallbackEx function to register a RegistryCallback routine, which is called every time a user process (or one of its threads) performs an operation on the registry. Of particular interest are callbacks which concern requests to open a key or to query a key or value, such as RegNtPreOpenKeyEx, RegNtPreQueryKeyEx and RegNtQueryValueKey. The callbacks may include pre-operation callbacks and/or post-operation callbacks. Most conveniently, a pre-operation callback (pre-notification) provides a notification to the kernel driver 705 before the configuration manager processes the intended registry operation, whereas a post-operation callback (post-notification) notifies the kernel driver 705 immediately after the operation completes, but before the configuration manager itself returns to the caller process 230. Hence, a pre-operation callback may be used in the example embodiments. This trigger point 725c causes the kernel driver 705 to confirm that the presented access token 231b has not deviated from the recorded access token 231a for that calling process 230x.

A fourth trigger point 725d concerns image loading. In this example the kernel driver 705 receives a callback whenever an image is mapped into memory, conveniently using the PsSetLoadImageNotifyRoutine callback API.

These images are typically executables or dynamic linked libraries (DLLs), and loading a malicious DLL is a common action for malware. However, if the calling process 230x has been the target of access token modification then this activity is detected and appropriate mitigation action can be taken.

A fifth trigger point 725e concerns access to the file system. A file creation notification or callback is used to alert the kernel driver 705 that a process is attempting to interact with the file system (or certain parts thereof). In this example, the kernel driver 705 may act as a file system filter driver 203. The kernel driver may register a callback, such as by the FsRtlRegisterFileSystemFilterCallbacks function. This fifth trigger point 725e is particularly useful for preventing ransomware attacks, wherein files on the computer device 200 are encrypted by malware and a monetary payment demanded for their decryption.

In these examples the protected resources 240 include any one or more of: processes and their threads operating on the computer device, the system registry including the keys and values therein, and the file system including the files and folders storing valuable data on the computer device.

In any of these examples, the intended operation is evaluated to determine whether or not to treat the relevant process has suffered an EoP attack. This evaluation is suitably performed by the kernel driver 705, and may use a set of policy rules which may define potential EoP attacks as against legitimate operation of the computer device. These rules may also define the protected resources with appropriate granularity. That is, the rules will not permit escalation of privilege against certain protected resources, whilst allowing EoP to affect other resources without interference, which might be needed for example to avoid adversely compromising legitimate performance of the computer device. Conveniently, these rules are established in the kernel driver 705 at system start-up, such as by being supplied from the policy file 750 of the policy server 720 by the service 701.

Ordinarily, the memory address of the access token 231 for a particular process 230 should not change during the lifetime of that process. However, malware may attempt to modify the address, such as by altering the address as stated in the EPROCESS structure of that process. Hence, an initial evaluation may comprise comparing the stated memory address pointing to the current access token 231b against the memory address recorded in the token cache 715 for that same process 230, as identified by the same PID. A potential EoP attack may be identified where those addresses differ.

A second stage of evaluation may then involve probing the given access tokens and comparing particular fields therein. For example, TokenUser may change from the SID of the logged-in user account 210 to a system SID (e.g. S-1-5-18). TokenGroups and TokenPrivileges may include additional groups and/or include higher privilege groups. TokenOwner may have a different SID from that seen previously (e.g. changing from the user's SID to the Administrator SID or System SID). TokenElevation may change value from '0' to '1'. TokenIntegrityLevel or TokenSource may change. TokenStatistics may reveal exceptional behaviour such as the updating the local unique identifier LUID in TokenID or Modified ID. As yet another example, ExpirationTime may change, such as to the time of the attack or to match the expiration time of another token used as a source for modifying the current token. These and other behaviours may be used, whether singly or in any combination, to indicate an EoP attack.

This evaluation of a potential EoP attack may include a gate decision in consultation with the service 701, e.g. to perform custom messaging with a respective outcome or response. Also, the kernel driver 705 may initiate and/or contribute to auditing of the requested operation. Where an EoP attack is determined then a mitigation action is taken. One example of mitigation is to suspend the process. Another example is to terminate the infected process. Notifications may also take place, either locally on the computer device or remotely through the servers to a security administrator. In one example, a suspect process may be allowed to continue for the time being while an outcome may be determined in relation to each specific requested operation (e.g. to block the requested operation, allow the operation, or perform the operation in a modified form). That is, the evaluation may in some examples link together a history of suspicious operations before determining that the process is malicious. Again, auditing and custom messaging may take place as discussed above.

In these examples, evaluating EoP attacks within the kernel driver 705 has a notable performance benefit. Firstly, the actions to be taken in response to an identified breech or offending behaviour are typically kernel-mode. For example, a mitigation action suitably immediately suspends or terminates the offending process. Secondly, rule evaluation in the kernel does not incur the overhead of kernel-mode to user-mode communication.

In other examples, the rule evaluation may take place, wholly or partially, within one or more user-mode components. Such a user-mode component may be implemented in a separate stand-alone component or, for example, may be provided within the agent service 701. This user-mode component may operate to evaluate appropriate access rules responsive to the intended operation as communicated by the kernel driver 705. In one example, the kernel driver 705 may message the user-mode component to perform rule matching, and may conveniently be informed in return of a set of one or more actions to be performed.

Figure 7:
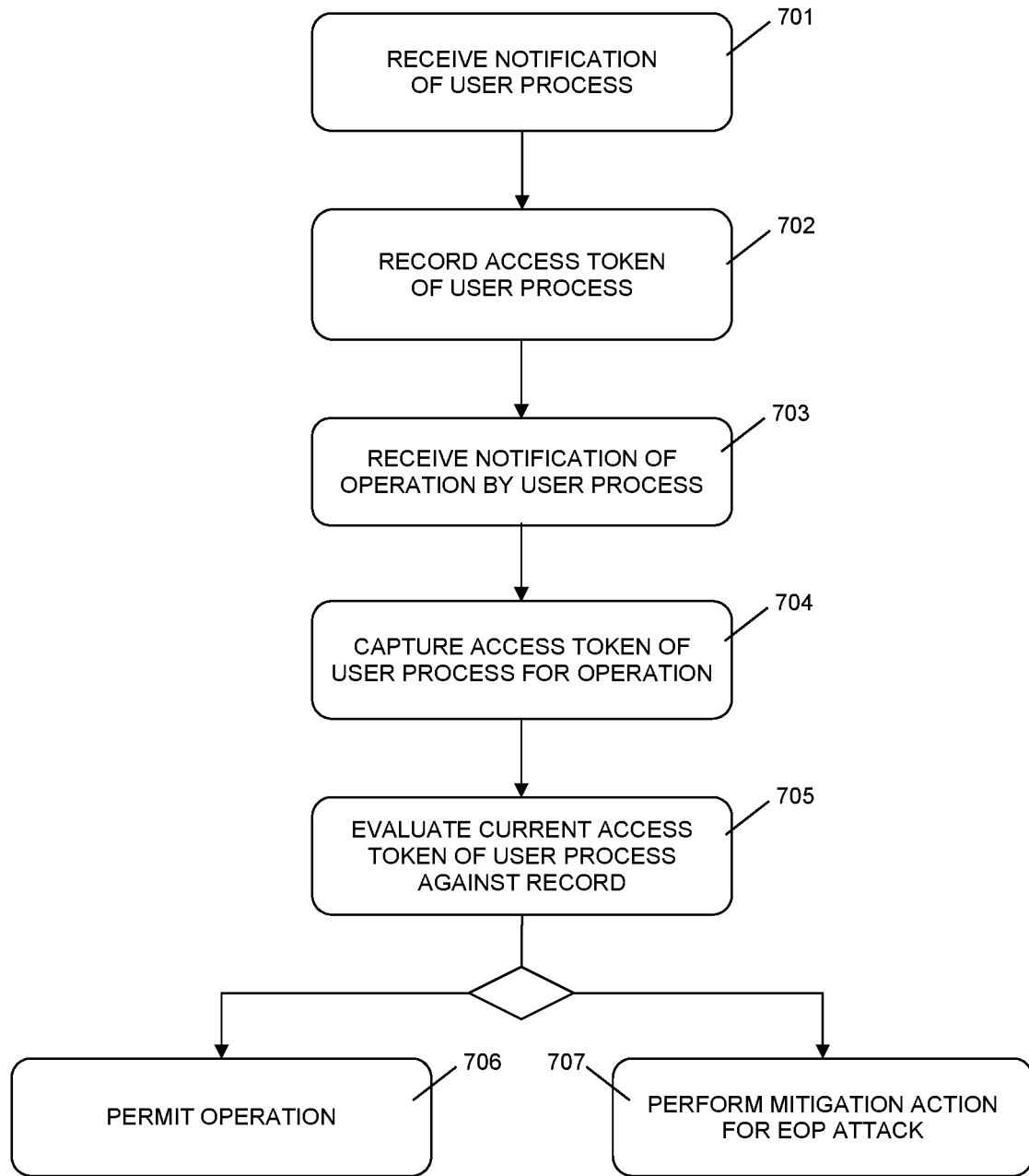
FIG. 7 is a flowchart of an example method.

FIG. 7 is a flowchart of an example method of protecting a computer device from EoP attacks. In one example this method may be performed within the computer device 200 as described herein. Step 801 may comprise receiving a notification that a process has started on the computer device. Step 802 may comprise recording information of an access token as associated with that user process into a token cache. Step 803 may comprise, at some later point in time, receiving notification of the user process interacting with the operating system to perform one of a set of predetermined operations on the computer device, suitably by activating any of a set of established trigger points. Step 804 comprises capturing an access token as presented by the user process at the trigger point. Suitably, step 805 comprises evaluating the captured access token against the access token as recorded earlier for that user process. Where this comparison reveals an unexpected change in the access token indicating an EoP attack then a mitigation action is taken as at step 706. Otherwise, the requested operation can be allowed to proceed as at step 807.

In summary, a mechanism has been described to detect escalation of privilege (EoP) attacks occurring within a computer device. Detection suitably occurs at an early stage before an elevated process has opportunity to make use of its elevated privileges. In at least some examples, the EoP defence mechanism upholds security of the computer device while still enabling privilege levels to be managed legitimately. Importantly, the detection mechanism is highly sensitive to trap malicious activity, but is robust to prevent false positives. Many other advantages and improvements will be appreciated from the discussion herein.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

The invention claimed is:

1. A system, comprising:
a memory storing a token cache and an operating system; and
at least one computing device in communication with the memory, the at least one computing device being configured to:
receive a first notification that a process has started on the at least one computing device;
in response to the first notification, record a first access token associated with the process into the token cache;
receive a second notification that the process has interacted with the operating system to perform at least one of a set of predetermined operations on the at least one computing device;
in response to the second notification, capture a second access token from the process;
perform a comparison of the second access token captured from the process against the first access token recorded into the token cache; and
determine that an escalation of privilege attack has occurred based on the comparison of the second access token captured from the process against the first access token recorded in the token cache.

2. The system of claim 1, wherein the at least one computing device is further configured receive the second notification subsequent to the first notification.

3. The system of claim 1, wherein the at least one computing device is further configured to present a custom message on a display associated with the at least one computing device in response to determining the escalation of privilege attack has occurred.

4. The system of claim 3, wherein the custom message comprises specific text configured in a policy file.

5. The system of claim 1, wherein the at least one computing device is further configured to perform an audit of the first notification and the second notification based on a policy file.

6. The system of claim 1, wherein the set of predetermined operations comprises at least one of:
creation of a child process of a user process;
requesting access to a system registry managed by the operating system;
loading an image of executable code into the memory; and
requesting access to a file system of the at least one computing device.

7. The system of claim 1, wherein the at least one computing device is further configured to terminate the process in response to determining that the escalation of privilege attack has occurred.

8. A method, comprising
receiving, via at least one computing device, a first notification that a process has started on the at least one computing device;
in response to the first notification, recording, via the at least one computing device, a first access token associated with the process into a token cache;
receiving, via the at least one computing device, a second notification that the process has interacted with an operating system of the at least one computing device to perform at least one of: a set of predetermined operations on the at least one computing device;
in response to the second notification, capturing, via the at least one computing device, a second access token from the process;
performing, via the at least one computing device, a comparison of the second access token captured from the process against the first access token recorded into the token cache; and
determining, via the at least one computing device, that an escalation of privilege attack has occurred based on the comparison of the second access token captured from the process against the first access token recorded in the token cache.

9. The method of claim 8, wherein the second notification is received subsequent to the first notification.

10. The method of claim 8, wherein performing the comparison further comprises detecting an unexpected change between the second access token and the first access token recorded into the token cache.

11. The method of claim 8, wherein performing the comparison further comprises determining that a memory address of the second access token differs from a memory address of the first access token recorded into the token cache.

12. The method of claim 8, wherein performing the comparison further comprises determining that a security identifier of the second access token differs from a security identifier of the first access token recorded into token cache.

13. The method of claim 8, further comprising suspending the process in response to determining that the escalation of privilege attack has occurred.

14. A non-transitory computer-readable medium embodying a program that, when executed by at least one computing device, causes the at least one computing device to:
- receive a first notification that a process has started on the at least one computing device;
- in response to the first notification, record a first access token associated with the process into a token cache;
- receive a second notification that the process has interacted with an operating system of the at least one computing device to perform at least one of: a set of predetermined operations on the at least one computing device;
- in response to the second notification, capture a second access token from the process;
- perform a comparison of the second access token captured from the process against the first access token recorded into the token cache; and
- determine that an escalation of privilege attack has occurred based on the comparison of the second access token captured from the process against the first access token recorded in the token cache.

15. The non-transitory computer-readable medium of claim 14, wherein the program further causes the at least one computing device to:
- monitor a set of trigger points where the process interacts with the operating system; and
- examine a current access token for the process in response to one of the set of trigger points being activated.

16. The non-transitory computer-readable medium of claim 15, wherein the program further causes the at least one computing device to receive, via one of the set of trigger points, a callback indicating that a thread has been created by the process.

17. The non-transitory computer-readable medium of claim 14, wherein the program further causes the at least one computing device to determine that the second access token has additional privileges than the first access token.

18. The non-transitory computer-readable medium of claim 14, wherein the program further causes the at least one computing device to determine that a memory address of the second access token differs from a memory address of the first access token recorded into token cache.

19. The non-transitory computer-readable medium of claim 14, wherein the program further causes the at least one computing device to determine that a security identifier of the second access token differs from a security identifier of the first access token recorded into token cache.

20. The non-transitory computer-readable medium of claim 14, wherein the program further causes the at least one computing device to perform a mitigation action in response to determining that the escalation of privilege attack has occurred.

* * * * *